US012590678B2

(12) United States Patent
Rebernik

(10) Patent No.: US 12,590,678 B2
(45) Date of Patent: Mar. 31, 2026

(54) SYSTEM COMPRISING A CRYOGENIC CONTAINER AND A SINGLE-PIECE ECONOMIZER

(71) Applicants: Cryoshelter LH2 GmbH, Dobl-Zwaring (AT); Cryoshelter BioLNG GmbH, Dobl-Zwaring (AT)

(72) Inventor: Matthias Rebernik, Dobl-Zwaring (AT)

(73) Assignees: Cryoshelter LH2 GmbH, Dobl-Zwaring (AT); Cryoshelter BioLNG GmbH, Dobl-Zwaring (AT)

( * ) Notice: Subject to any disclaimer, the term of this patent is extended or adjusted under 35 U.S.C. 154(b) by 255 days.

(21) Appl. No.: 18/691,324

(22) PCT Filed: Sep. 15, 2022

(86) PCT No.: PCT/EP2022/075617
§ 371 (c)(1),
(2) Date: Mar. 12, 2024

(87) PCT Pub. No.: WO2023/041625
PCT Pub. Date: Mar. 23, 2023

(65) Prior Publication Data

US 2024/0377036 A1 Nov. 14, 2024

(30) Foreign Application Priority Data

Sep. 15, 2021 (AT) .............................. A 50189/2021

(51) Int. Cl.
*F17C 7/02* (2006.01)
*F17C 13/04* (2006.01)

(52) U.S. Cl.
CPC ................ *F17C 13/04* (2013.01); *F17C 7/02* (2013.01); *F17C 2205/0323* (2013.01);
(Continued)

(58) Field of Classification Search
CPC .............. F17C 13/04; F17C 2205/0323; F17C 2205/0388; F17C 2205/035; F17C 7/02; F17C 9/02
See application file for complete search history.

(56) References Cited

U.S. PATENT DOCUMENTS 6,125,637 A * 10/2000 Bingham ............... F02M 21/06 62/7
9,682,618 B2 * 6/2017 Baik ....................... F16K 31/06
(Continued)

FOREIGN PATENT DOCUMENTS

DE 102008063563 A1 6/2009
EP 3121505 A1 1/2017
(Continued)

OTHER PUBLICATIONS

International Search Report, mailed Jan. 26, 2023, from PCT/EP2022/075617, 14 pages.

*Primary Examiner* — Filip Zec
(74) *Attorney, Agent, or Firm* — Workman Nydegger

(57) ABSTRACT

The invention relates to a system including a cryogenic container, such as an LNG container or a hydrogen container, with a first removal line for removing cryogenic fluid in a gas phase and a second removal line for removing cryogenic fluid in a liquid phase being routed into the cryogenic container. The system includes a single-piece economizer valve block having at least a first and a second inlet port and an outlet port, the two inlet ports and the outlet port being connected inside the single-piece economizer valve block by a connection passage having a connecting portion on the gas phase side, a connecting portion on the liquid phase side and a connecting portion on the end side, the single-piece economizer valve block having at least one valve recess open towards the outside, the valve recess
(Continued)

starting at the node, and a valve being inserted into the valve recess.

19 Claims, 10 Drawing Sheets

(52) U.S. Cl.
CPC .. *F17C 2221/012* (2013.01); *F17C 2221/033* (2013.01); *F17C 2223/0161* (2013.01); *F17C 2223/043* (2013.01); *F17C 2223/046* (2013.01); *F17C 2227/0388* (2013.01)

(56) References Cited

U.S. PATENT DOCUMENTS

| | | | | |
|---|---|---|---|---|
| 9,739,420 | B2 * | 8/2017 | Lee | F17C 7/04 |
| 11,174,991 | B2 * | 11/2021 | Thor | F17C 9/04 |
| 11,300,248 | B2 * | 4/2022 | Frère | F17C 5/02 |
| 11,351,747 | B2 * | 6/2022 | Clark | B29D 99/0078 |
| 11,415,084 | B2 * | 8/2022 | Bartlok | F17C 7/04 |
| 11,459,851 | B2 * | 10/2022 | Aulia | E21B 33/03 |
| 11,480,301 | B2 * | 10/2022 | Beuneken | F17C 5/02 |
| 11,698,169 | B2 * | 7/2023 | Hodgson | F17C 13/002 62/48.1 |
| 11,708,736 | B1 * | 7/2023 | Mukhles | E21B 17/20 166/55.1 |
| 12,085,234 | B2 * | 9/2024 | Patelczyk | F17C 6/00 |
| 12,429,143 | B2 * | 9/2025 | Park | F16K 31/0693 |
| 2005/0193990 | A1 | 9/2005 | Bingham et al. | |
| 2016/0215930 | A1 * | 7/2016 | Nelson | B63B 25/16 |
| 2016/0216029 | A1 * | 7/2016 | Ragot | B63B 25/16 |
| 2018/0043600 | A1 * | 2/2018 | Jung | B29C 48/022 |
| 2020/0149654 | A1 * | 5/2020 | Cao | F16K 27/029 |
| 2021/0094204 | A1 * | 4/2021 | Massow | B29C 48/297 |
| 2021/0372566 | A1 * | 12/2021 | Clarke | F17C 7/04 |
| 2023/0366515 | A1 * | 11/2023 | Rebernik | F17C 13/00 |
| 2024/0165866 | A1 * | 5/2024 | Meinhardt | F17C 9/02 |

FOREIGN PATENT DOCUMENTS

| | | | |
|---|---|---|---|
| EP | 3236132 | A1 | 10/2017 |
| EP | 3376013 | A1 | 9/2018 |

* cited by examiner

SYSTEM COMPRISING A CRYOGENIC CONTAINER AND A SINGLE-PIECE ECONOMIZER

BACKGROUND

Background and Relevant Art

The invention relates to a system comprising a cryogenic container, in particular an LNG container or a hydrogen container, with a first removal line for removing cryogenic fluid in the gas phase and a second removal line for removing cryogenic fluid in the liquid phase being routed into the cryogenic container.

According to the prior art, liquefied gases can be stored in containers ("cryogenic containers") so as to be stored as a fuel for an engine, for example. Liquefied gases are gases that are in the liquid state at boiling temperature, with the boiling temperature of this fluid being pressure-dependent. If such a cryogenic liquid is filled into a cryogenic container, a pressure corresponding to the boiling temperature is established, apart from thermal interactions with the cryogenic container itself.

In the application field of automotive engineering, the cryogenic fluid can serve as a fuel for a vehicle, for which purpose the cryogenic container is carried along on the vehicle. Cryogenic containers are usually mounted on the side of the vehicle frame, where only an extremely limited installation space is provided, however. A problem often discussed in the prior art is therefore where to place components of the removal system and the filling system of the cryogenic container. In particular, the removal system of the cryogenic container comprises a very large number of components, such as, for example, a heat exchanger, in order to heat cryogenic fluid removed from the cryogenic container for the supply to an engine of the vehicle or, respectively, to bring it into the gaseous state. Furthermore, it is known that a so-called economizer is provided in the removal system. The purpose of the economizer is to allow both gaseous and liquid cryogenic fluid to be removed from the cryogenic container. The economizer controls-simply speaking-as to whether liquid cryogenic fluid should be removed in a normal operating mode or as to whether gaseous cryogenic fluid should be removed in a mode of operation, if necessary for the reduction of pressure. For this purpose, the economizer comprises two valves, one being provided in a removal line for liquid cryogenic fluid and one being provided in a removal line for gaseous cryogenic fluid.

However, the size of the components is only one of the factors limiting the available installation space. Another relevant factor is the large number of lines that have to be routed between the components. For example, looking at the system disclosed in EP 3 376 013 A1, it becomes apparent that the required lines and the associated connecting pieces occupy almost the entire available installation space on the end cap of the cryogenic container.

However, the large installation space occupied by the lines is not the only problem prevailing in systems such as those shown in EP 3 376 013 A1. Another problem is, for example, that each end of a line must be sealed when connected to a component. It is evident that errors or, respectively, connections that do not seal completely can frequently occur because of the large number of connecting pieces.

At the same time, however, the lines known from the prior art are highly valued by persons skilled in the art because they are easily replaceable and therefore easy to maintain. In addition, individual components such as the heat exchanger can be easily detached from the lines, causing the system to be highly modular.

BRIEF SUMMARY

It is the object of the invention to design the removal system of a cryogenic container so as to be more compact and less prone to errors.

This object is achieved by a system comprising a cryogenic container, in particular an LNG container or a hydrogen container, with a first removal line for removing cryogenic fluid in the gas phase and a second removal line for removing cryogenic fluid in the liquid phase being routed into the cryogenic container, the system comprising a single-piece economizer valve block having at least a first inlet port, a second inlet port and an outlet port, the two inlet ports and the outlet port being connected inside the single-piece economizer valve block by a connection passage having a connecting portion on the gas phase side, a connecting portion on the liquid phase side and a connecting portion on the end side, which converge at a node, wherein the first removal line is connected to the first inlet port and the second removal line is connected to the second inlet port, the single-piece economizer valve block having at least one valve recess open towards the outside, the valve recess starting at the connecting portion on the gas phase side, at the connecting portion on the liquid phase side or at the node on the connection passage, and a valve being inserted into the valve recess of the single-piece economizer valve block.

According to the invention, a "single-piece economizer" is created for the first time, whereby individual lines are eliminated and the number of connecting points is reduced. An economizer usually requires two separate valves, with each of them having an input line and an output line, with the output lines then leading to a T-piece, the output line of which is, in turn, routed to the heat exchanger. All those individual components and the connection points located therebetween can be combined in a single economizer valve block which occupies significantly less space and does not have to exhibit any internal connecting points, also making it less prone to errors.

According to the invention, several components of the removal system are thus combined for the first time, which is rendered possible by the economizer valve block. Although one would assume that a single-piece economizer valve block should have a greater weight than the individual components, which is considered taboo especially in vehicle engineering, it has surprisingly become apparent that, by using an economizer valve block, the required installation space can be reduced to such an extent that, for example, the cryogenic container itself can be designed larger or, respectively, other components can be arranged in the gained installation space, which increases the efficiency of the overall system. In addition, the reduction in the length of the lines in the system already causes the removal system to operate more efficiently and with less heat loss so that the disadvantage of the additional weight is overcome already at this point. Furthermore, the weight of the block can also be optimized, for example, if the valve block is manufactured as a cast block so that an overall weight advantage can even be achieved in comparison to the prior art.

Furthermore, it has surprisingly also been shown that all of the advantages valued by the lines are preserved also in the "combined" economizer valve block according to the invention. On the one hand, individual components such as the heat exchanger can be separated from the economizer valve block just as easily. On the other hand, there is also no longer any need to replace individual lines, as they are already incorporated directly into the economizer valve block.

In order to further reduce the components of the system according to the invention, a restructure of the economizer known per se with two separate valves thanks to the novel economizer valve block can especially be provided. For this purpose, the valve recess can start at the node of the connection passage, and the valve can be designed as a multi-way valve between the connecting portion on the gas phase side, the connecting portion on the liquid phase side and the connecting portion on the end side. Instead of two valves, only one valve, which is attached directly to the node, is thus provided.

In the aforementioned embodiment, it can, for example, be envisaged that the valve allows only three switching states, wherein, in the first switching state, only the connection to the connecting portion on the gas phase side is completely closed, in the second switching state, only the connection to the connecting portion on the liquid phase side is completely closed and, in the third switching state, both the connection to the connecting portion on the gas phase side and that to the connecting portion on the liquid phase side are completely closed. As a result, the valve and an associated control unit can be designed in a particularly simple fashion.

In order to enable more precise control, it can alternatively be envisaged that the valve is designed for selectively throttling the connection to the connecting portion on the liquid phase side and the connection to the connecting portion on the gas phase side, i.e., the ratio between the gas phase and the liquid phase can be chosen freely, for example, in mutual dependence with exemplary openings (in %) of 70/30, 80/20, 90/10 etc. or in mutual independence with exemplary openings (in %) of 90/90, 50/60, 10/0 etc. In any case, however, it can be envisaged that both the connecting portion on the gas phase side and the connecting portion on the liquid phase side can be blocked at the same time.

As an alternative or in addition to the aforementioned embodiments, the economizer cannot be formed or, respectively, cannot be formed only by providing a valve at the node, but by providing a valve on the connecting portion on the gas phase side and a valve on the connecting portion on the liquid phase side. This means that the single-piece economizer valve block has a first and a second valve recess open towards the outside, the first valve recess starting at the connecting portion on the gas phase side and the second valve recess starting at the connecting portion on the liquid phase side, with a first valve being inserted into the first valve recess and a second valve being inserted into the second valve recess, the first and second valves each being proportional valves or valves with discrete switching states.

In all of the above-mentioned embodiments, it is furthermore advantageous that the valves can be used simultaneously for completely blocking a flow, which is not provided for conventional economizers. In particular, the valves can be closed by means of a manually operable emergency stop switch. Alternatively, the valves can be connected to a control line which is routed to electronics of a vehicle, whereby the valves can be closed automatically in case of an emergency such as an accident, for example. The safety of the removal system can thereby be increased at the same time. In addition, it can be envisaged that the valves can additionally also be locked manually, e.g., in the event of service, in order to give the person the security of being able to rule out any malfunction of the valves.

According to the invention, not only the economizer and its connections or, respectively, branches can be combined, but other components of the system, too. In particular, it has surprisingly been established that it is even possible to combine all components of the removal system that are located between the cryogenic container and the heat exchanger. In particular, the economizer valve block can comprise:

- a further valve recess open towards the outside and starting preferably at the connecting portion on the gas phase side (alternatively also within that on the end side or the liquid phase side) or at a further connecting portion separate from the aforementioned connecting portions, wherein, for example, a pressure relief valve is connected to the further valve recess, e.g., connected to the further valve recess via a line or inserted directly into the further valve recess: alternatively, other valves such as a mixing valve, a proportional valve or a valve with discrete switching states could also be inserted into the further valve recess. In other words, the single-piece economizer valve block may accommodate or provide connections for two or more valves.
- a connection recess for a drain connection, the connection recess being open towards the outside and starting preferably at the connecting portion on the liquid phase side (alternatively also within that on the end side, the gas phase side or any other), wherein the drain connection is designed as a shut-off valve and can be inserted directly into the connection recess or is connected thereto via a line;
- one or several sensor recesses for a sensor connection, the sensor recesses being open towards the outside and starting at the connecting portion on the gas phase side, at the connecting portion on the liquid phase side, at the connecting portion on the end side and/or at the further connecting portion; and/or
- a recess for an overflow valve at the connecting portion on the end side.

Furthermore, it has been shown that, for the purpose of gaining further space, the economizer valve block can even comprise additional components or, respectively, connection passages that are not connected to the above-mentioned connecting portions. For example, the single-piece economizer valve block can comprise a further inlet port and a further outlet port, which are connected by a further connection passage, the further connection passage not communicating with the first-mentioned connection passage. This is particularly advantageous because not always is there enough space between the economizer valve block and other components such as a heat exchanger for laying a separate line between them. For this reason, the valve block can have this line routing already integrated within it.

In the aforementioned embodiment, the further connection passage can be provided as a through line or, respectively, a connecting line for a pressure management system or for a heat exchange medium of the heat exchanger. The economizer valve block can also combine the two embodiments, for example, if the single-piece economizer valve block has two further connection passages that communicate neither with each other nor with the first-mentioned connection passage, with one of the further connection passages being connected to a pressure management system and the other one of the connection passages being connected to an input line for heat exchange medium.

Particularly preferably, the aforementioned system furthermore comprises a heat exchanger, the outlet port of the single-piece economizer valve block being connected directly to an inlet of the heat exchanger, without any intermediate line. The economizer valve block can thus be attached directly to the heat exchanger without the need for an intermediate line. This can be implemented, for example, by welding the two components together and/or if the respective openings to be connected to each other have an outwardly projecting nozzle, which are welded together or connected by means of a sleeve. If the economizer valve block has said further connection passage, both the outlet port and the further outlet port can be connected to the heat exchanger. In its interior, the heat exchanger can comprise, for example, two separate heat exchanger tubes, and the first-mentioned connection passage can be connected to the first heat exchanger tube and the second-mentioned connection passage can be connected to the second heat exchanger tube.

A particularly large amount of space can be saved if the heat exchanger has a rod-shaped design with a generated surface and two lateral surfaces, with the economizer valve block being arranged in an extension of the heat exchanger next to one of the lateral surfaces.

Surprisingly, the economizer valve block even makes it possible that the economizer valve block can replace a lateral surface of the heat exchanger, e.g., if the system comprises a rod-shaped heat exchanger with a jacket, the economizer valve block forming one of the lateral surfaces of the heat exchanger and a first end of the jacket being connected to the economizer valve block in a fluid-tight manner.

In general, the economizer valve block could be arranged next to an end cap of the cryogenic container in order to gain space there. However, especially in case of the present economizer valve block, it makes sense to arrange both components on the generated surface, as a result of which no additional space has to be provided next to the cryogenic container, whereby the latter can be designed so as to be particularly long. For this purpose, the cryogenic container has a cryogenic container jacket and two end caps, wherein the heat exchanger has a rod-shaped design and is arranged essentially in parallel to the cryogenic container jacket and both the heat exchanger and the economizer valve block next to the cryogenic container jacket preferably lie completely between the outer faces of the end caps, i.e., will not protrude in the longitudinal direction of the cryogenic container beyond the latter, whereby connecting lines at the side of the cryogenic container can be installed more easily and could protrude longitudinally beyond the cryogenic container.

Alternatively or additionally, the heat exchanger and/or the economizer valve block could also protrude beyond one of the end caps, with at least one, preferably all, of the inlet ports and/or outlet ports being arranged in a direction towards the vehicle frame, i.e., lying perpendicular to the longitudinal axis of the heat exchanger or, respectively, the cryogenic container and pointing towards the vehicle frame.

Furthermore, the system preferably comprises a control unit which is connected to at least one valve, preferably to all valves, of the economizer valve block, the control unit being designed for adjusting the removal ratio of gas phase to liquid phase of the cryogenic fluid from the cryogenic container. The control of the valves could even occur manually in some cases, but a control unit is preferred. The control unit can actuate the valves in such a way that they will assume the function of an economizer, as is generally known to those skilled in the art. For example, the ratio of gas phase to liquid phase is increased (with, for example, only gas phase being removed in extreme cases) when the pressure or temperature in the cryogenic container approaches a maximum permissible pressure in order to reduce the pressure in the cryogenic container without any loss of cryogenic fluid.

In the aforementioned embodiment, it is particularly preferred if the system comprises at least one sensor which is preferably inserted into a sensor recess of the economizer valve block or of a pressure management valve block, the control unit being designed for controlling the valve or valves depending on a measured value supplied by the sensor. If the sensors are also accommodated in the corresponding valve blocks, a particularly compact system is made possible.

BRIEF DESCRIPTION OF THE DRAWINGS

Advantageous and non-limiting embodiments of the invention are explained in further detail below with reference to the drawings.

DETAILED DESCRIPTION

Figure 1:
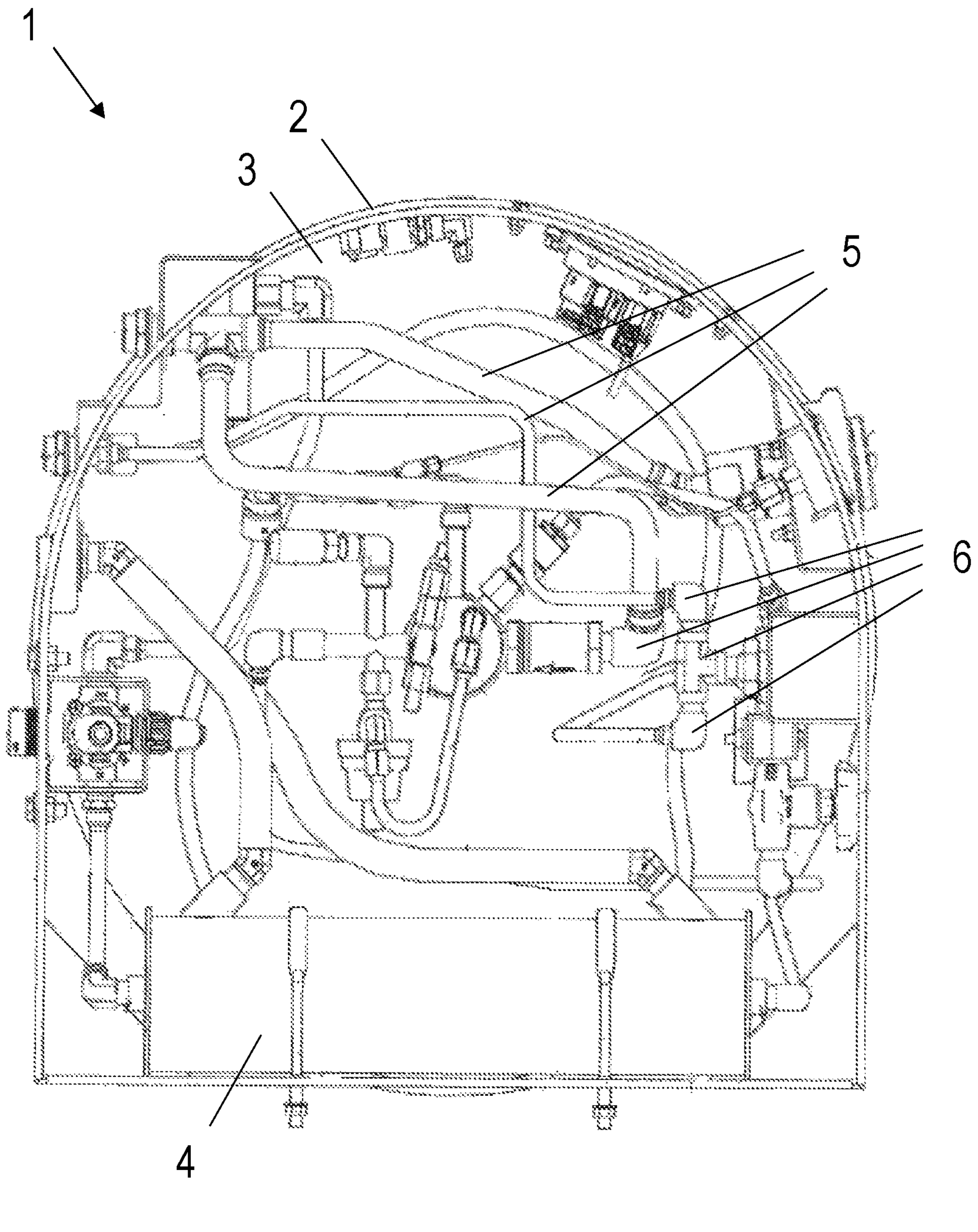
Fig. 1 (Prior Art)
FIG. 1 shows a removal system and a filling system of a cryogenic container according to the prior art.

FIG. 1 shows a cryogenic container 1 according to the prior art in a side view. The cryogenic container 1 has a cryogenic container jacket 2 and an end cap 3. In the illustrated example, the cryogenic container jacket 2 is cylindrical, which is only partially visible due to the chosen view. On an end cap 3 of the cryogenic container 1, a removal system is arranged, which comprises, among other things, a heat exchanger 4, several lines 5 and connecting elements 6 of the lines 5. The connecting elements 6 are, for example, T-pieces or angles.

It is clearly visible in FIG. 1 that the lines 5 occupy almost the entire installation space in front of the cryogenic container 1, whereby the cryogenic container 1 has to be designed shorter than what would be basically possible, or whereby further components have to be arranged in other places. In addition, an error-prone sealing connection must be produced at any interface between the line 5 and the connecting element 6.

FIGS. 2-13 now show a system by means of which the required space is reduced and in which there is less susceptibility to errors. Furthermore, with this system, the assembly effort is greatly reduced, the testing effort is decreased, and costs are reduced. Since the cryogenic container 1, the cryogenic container jacket 2 and the end caps 3 thereof, and the heat exchanger 4 can be designed equally or similarly to FIG. 1, the same reference symbols are used.

In the cryogenic container 1 as considered herein, cryogenic fluid is stored in the gaseous state 7 or in the liquid state 8. For example, the cryogenic fluid can be hydrogen so that the cryogenic container 1 is a hydrogen container, or the cryogenic fluid can be LNG (Liquefied Natural Gas) so that the cryogenic container is an LNG container. Depending on the cryogenic fluid, the cryogenic container is thus designed for storing cryogenic fluid at temperatures of, for example, below 150 Kelvin, in case of hydrogen even of below 50 Kelvin or below 30 Kelvin or essentially of 20 Kelvin. Depending on the application, the cryogenic container 1 could be designed, for example, for storing sLH2 (subcooled liquid hydrogen) or CcH2 (cryo-compressed hydrogen) and thus also for corresponding high pressures, for example for maximum pressures of between 5 bar and 350 bar.

The cryogenic container 1 described herein is usually used as a fuel tank of a vehicle (not illustrated any further) and can be mounted for this purpose, for example, on the vehicle frame of the vehicle. For supplying the cryogenic fluid as a fuel to a drive such as, e.g., an engine or a fuel cell of the vehicle, two removal lines 9, 10 are routed into the cryogenic container 1. The first removal line 9 is routed into the area which, in the operating position of the cryogenic container 1, is at the top in order to remove gaseous cryogenic fluid, and the second removal line 10 is routed into the area which, in the operating position of the cryogenic container 1, is at the bottom in order to remove liquid cryogenic fluid. The removal lines 9, 10 pass either through the cryogenic container jacket 2 or through one of the end caps 3 and are thus guided out of the cryogenic container 1.

Figure 4:
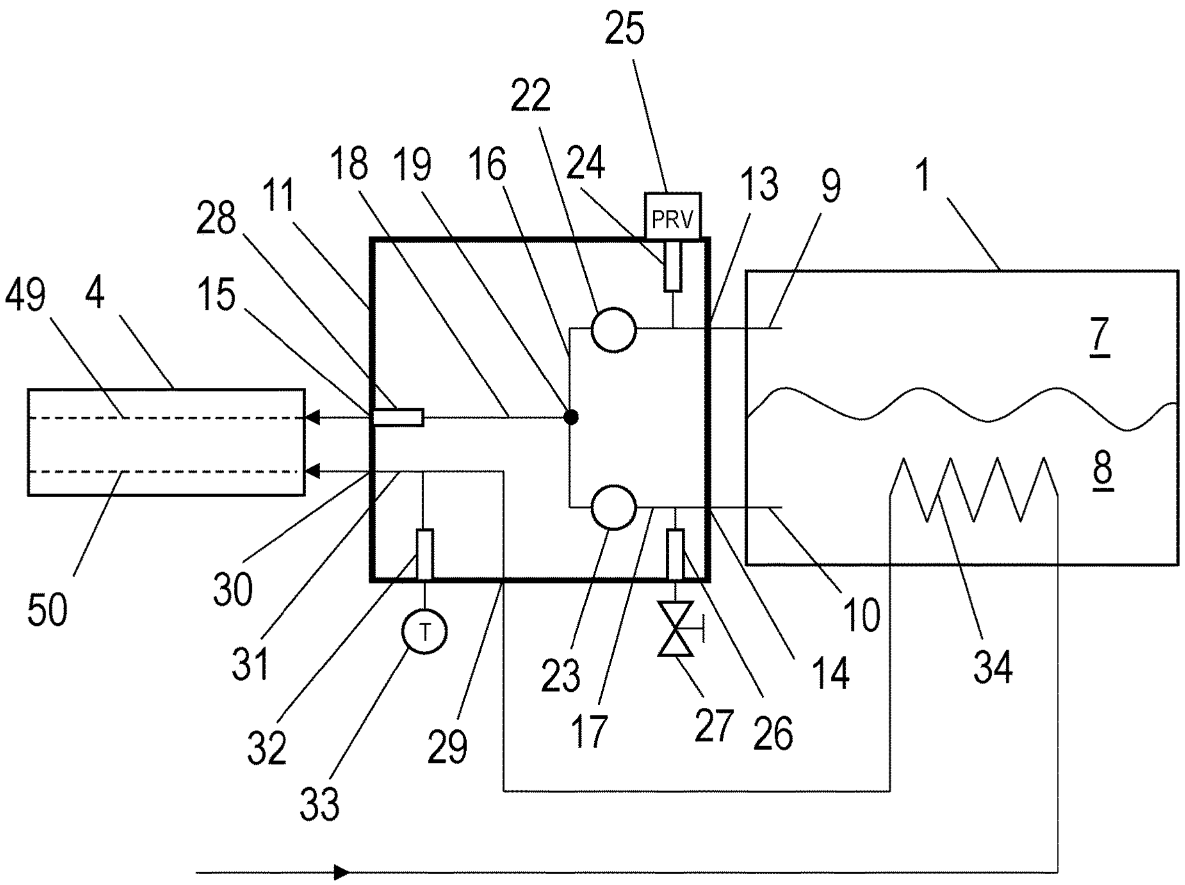
FIG. 4 shows an economizer valve block according to the invention in a second embodiment.
Figure 5:
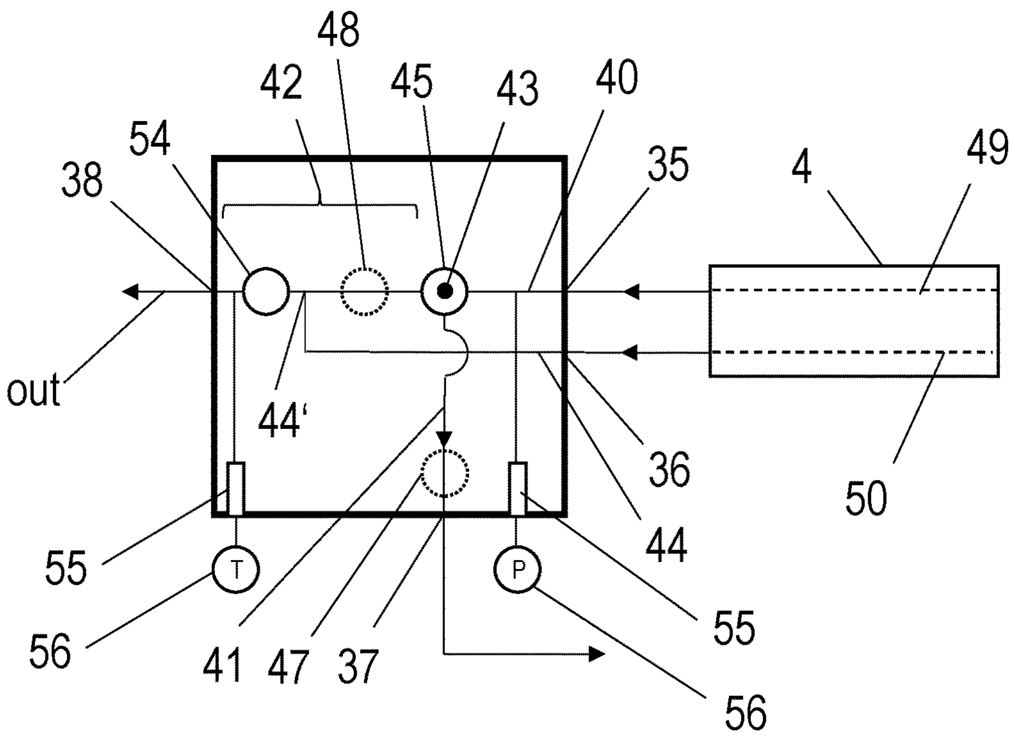
FIG. 5 shows a pressure management valve block according to the invention in a first embodiment.
Figure 6:
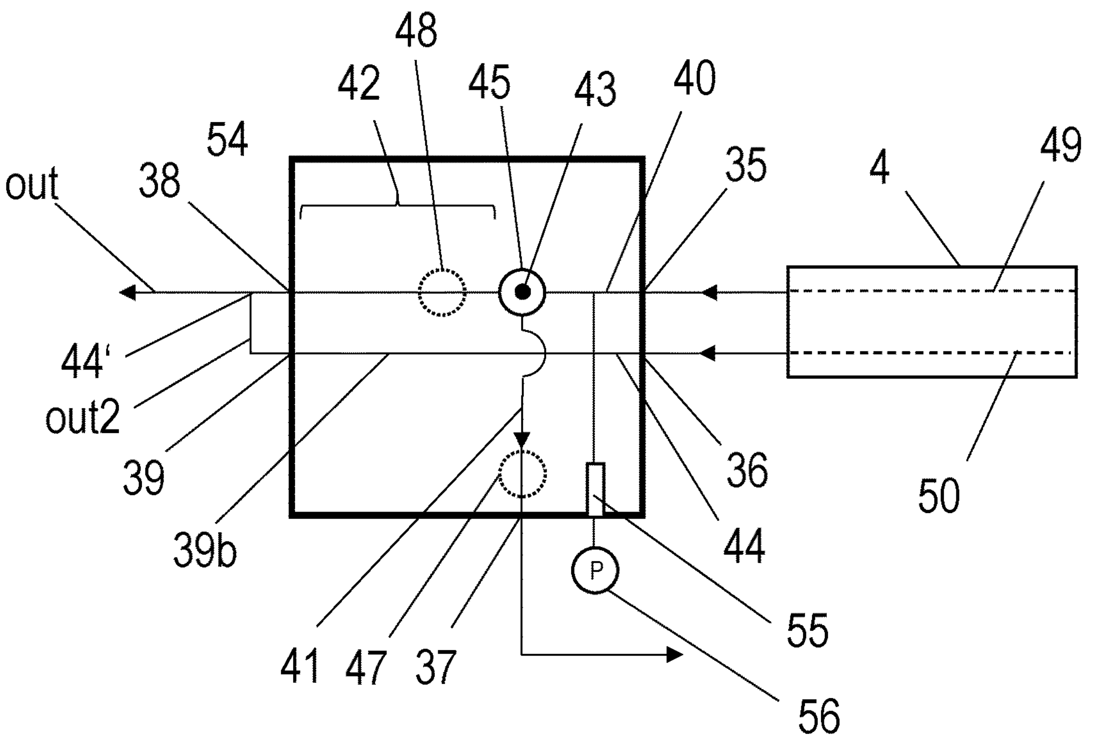
FIG. 6 shows a pressure management valve block according to the invention in a second embodiment.

In order to make sure that no increased space requirement results from lines as shown in FIG. 1, selected components are designed in front of and/or behind the heat exchanger 4, integrated as a so-called economizer valve block 11 (FIGS. 2 to 4) or, respectively, as a so-called pressure management valve block 12 (FIGS. 5 and 6).

The economizer valve block 11 is designed as a single-piece valve block, which, for example, is made of stainless steel, which is particularly preferred if the cryogenic fluid is hydrogen, or is made of brass. The economizer valve block 11 has a first inlet port 13 for the first removal line 9 and a second inlet port 14 for the second removal line 10. Furthermore, the economizer valve block 11 has an outlet port 15 for connection to the heat exchanger 4.

Inside the economizer valve block 11, the first inlet port 13, the second inlet port 14 and the outlet port 15 are connected by a connection passage. The connection passage is composed of a connecting portion on the gas phase side 16, a connecting portion on the liquid phase side 17 and a connecting portion on the end side 18, which converge at a node 19.

The connection passage can have a diameter that corresponds to the inner diameter of the known lines 5 from FIG. 1, wherein the diameter of the connection passage inside the economizer valve block 11 can also vary. For example, the diameters in the connecting portion on the gas phase side 16, in the connecting portion on the liquid phase side 17 and in the connecting portion on the end side 18 can be designed differently. The connection passage can be produced by drilling or, for example, can be produced directly together with the economizer valve block 11 as the latter is being cast. The same applies to the pressure management valve block 12, which will be explained in further detail below.

In order to realize a so-called economizer in the economizer valve block 11, one or several valves is/are provided in the economizer valve block 11 to control the removal ratio of cryogenic fluid in the liquid phase and in the gas phase, whereby, for example, the pressure in the cryogenic container 1 can be actively influenced, without gaseous cryogenic fluid being released into the environment. The mode of operation of an economizer is well known and, therefore, will not be discussed any further herein.

Figure 2:
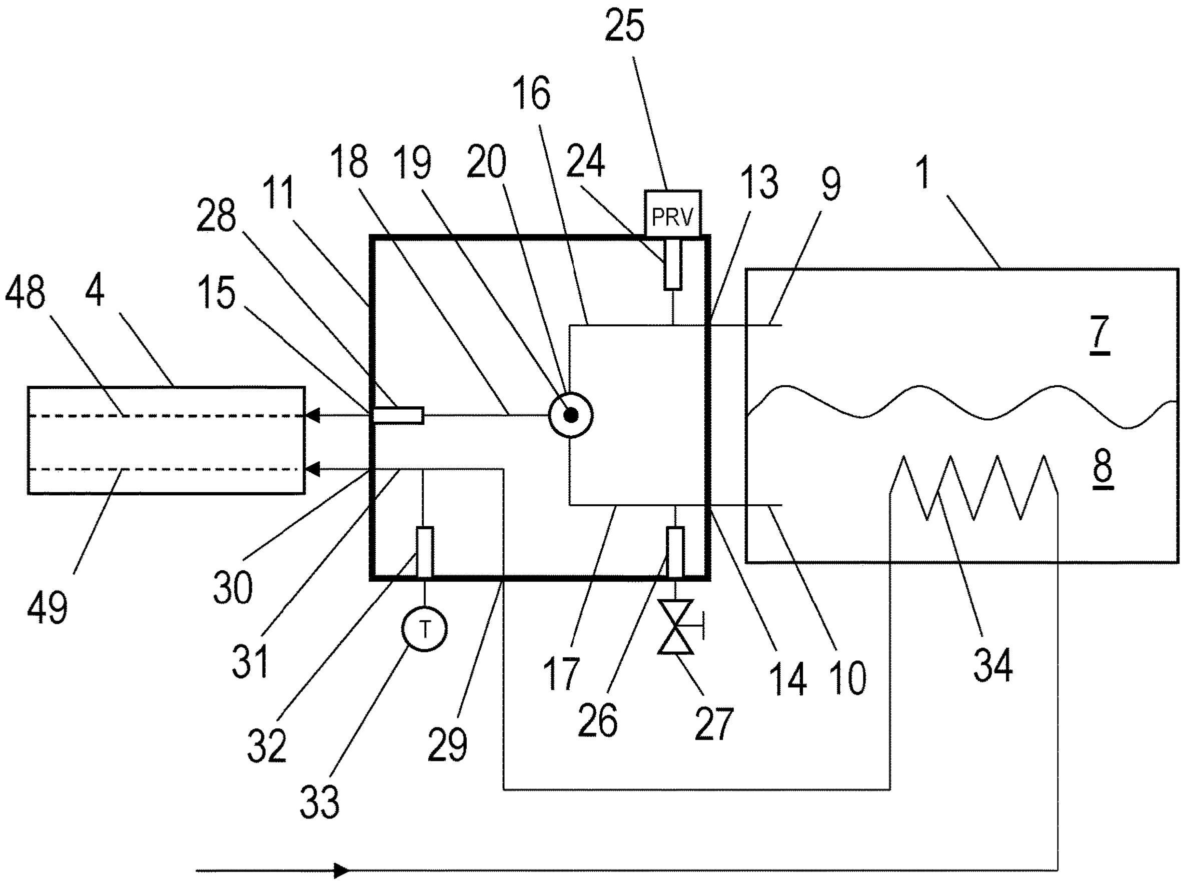
FIG. 2 shows an economizer valve block according to the invention in a first embodiment.

FIG. 2 shows an embodiment in which the economizer valve block 11 has a valve recess 20 that is open towards the outside and starts at the node 19. A valve 21 (FIG. 3) can now be inserted into this valve recess 20 in order to control which proportion of gaseous and liquid cryogenic fluid will reach the connecting portion on the end side 18 and thus the heat exchanger 4. In this embodiment, the valve 21 is designed as a multi-way valve since it determines an aperture ratio between the connecting portion on the gas phase side 16, the connecting portion on the liquid phase side 17 and the connecting portion on the end side 18.

Figure 3:
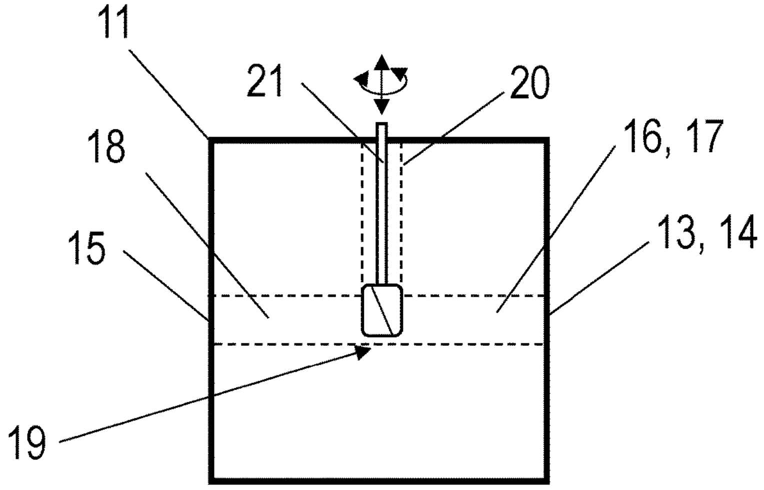
FIG. 3 shows the economizer valve block of FIG. 2 in a side view.

FIG. 3 shows one way in which the valve 21 can adjust the removal ratio. Assuming that FIG. 2 depicts a top view of the economizer valve block 11, FIG. 3 depicts a side view of the economizer valve block 11. In this example, the connection passage between the ports 13, 14, 15 lies essentially in one plane. Through this view, the connecting portion on the gas phase side 16 and the connecting portion on the liquid phase side 17 thus coincide. Perpendicularly to the aforementioned plane, the valve recess 20 passes through the economizer valve block 11 from top to bottom until it reaches the node 19. By rotation or longitudinal displacement—depending on the design—the valve 21 inserted into the valve recess 20 can now control the ratio in which the connecting portion on the gas phase side 16 or, respectively, the connecting portion on the liquid phase side 17 is connected to the connecting portion on the end side 18.

In the simplest case, the valve 21 designed as a multi-way valve only allows three switching states, wherein, in the first switching state, only the connection to the connecting portion on the gas phase side 16 is completely closed, in the second switching state, only the connection to the connecting portion on the liquid phase side 17 is completely closed and, in the third switching state, both the connection to the connecting portion on the gas phase side 16 and that to the connecting portion on the liquid phase side 17 are completely closed.

In other cases, it is possible to design the multi-way valve as a proportional valve in order to selectively throttle the connection to the connecting portion on the gas phase side 16 and the connection to the connecting portion on the liquid phase side 17. As a result, it is possible, for example, to open the connection between the connecting portion on the gas phase side 16 and the connecting portion on the end phase side 18 by X % and, depending on that, to open the connection between the connecting portion on the liquid phase side 17 and the connecting portion on the end phase side 18 by 100−X %, wherein 0≤X≤100. Alternatively, the multi-way valve could be designed for opening the connection between the connecting portion on the gas phase side 16 and the connecting portion on the end phase side 18 by between 0-100% and, regardless of that, for opening the connection between the connecting portion on the liquid phase side 17 and the connecting portion on the end phase side 18 by between 0-100%. These different embodiments serve the purpose of minimizing the pressure losses between the cryogenic container and the consumer (the engine). The pressure losses are lost as an unusable pressure interval for the hold time (storage period free from blowing off). At the same time, there is a desire to be able to consciously set pressure differences between certain line paths in certain operating states.

FIG. 4 shows an embodiment in which the economizer valve block 11 has two valve recesses 22, 23 open towards the outside, with the first one starting at the connecting portion on the gas phase side 16 and the second one starting at the connecting portion on the liquid phase side 17. In this embodiment, a first valve (not illustrated) is inserted into the first valve recess 22, and a second valve (not illustrated) is inserted into the second valve recess 23. The first and second valves can each be proportional valves, i.e., they can be opened by between 0-100% interdependently or independently of each other. Alternatively, the valves could only have discrete switching states, e.g., they could only be closed completely or opened completely and, if necessary, they could assume an intermediate position of being, for example, 50% open.

The embodiments of FIGS. 2 to 4 could also be combined, i.e., valve recesses 20, 22, 23 open towards the outside could start at the node 19, at the connecting portion on the gas phase side 16 and at the connecting portion on the liquid phase side 17, with valves being inserted into all three valve recesses and all three valves being controllable separately, for example.

However, as can be seen in FIGS. 2 and 4, the economizer valve block 11 can implement not only the economizer within a single-piece valve block, but even more elements can be integrated within the economizer valve block 11 so that, for example, fewer T-pieces or the like have to be incorporated into the removal lines 9, 10.

As shown in FIG. 2, the economizer valve block 11 can, for example, have a further valve recess 24 open towards the outside and starting at the connecting portion on the gas phase side 16, with a pressure relief valve 25 being connected to the further valve recess 24, being inserted therein, for example. The pressure relief valve 25 serves for releasing gaseous cryogenic fluid from the cryogenic container 1 when the pressure rises therein in order to reduce the risk of damage to the cryogenic container 1. Therefore, it is usually envisaged that the pressure relief valve 25 is attached to the connecting portion on the gas phase side 16 in front of the valve recess 20 or 22, rather than behind the valve recess 20 or 22, since the valve 21 could be closed due to a malfunction, for example, as a result of which the cryogenic container 1 would no longer be connected to the pressure relief valve 25. The pressure relief valve 25 can be inserted directly into the further valve recess 24 or can be connected to the further valve recess 24 by means of a connecting line.

Furthermore, FIG. 2 shows that the economizer valve block 11 can have a connection recess 26 for a drain connection 27, the connection recess 26 being open towards the outside and being connected to the connecting portion on the liquid phase side 17, i.e., a further connection passage is provided which connects the connection recess 26 to the connecting portion on the liquid phase side 17. The drain connection 27 serves for emptying the cryogenic container 1 manually without having to guide the cryogenic fluid through the downstream components such as the heat exchanger 4.

Furthermore, the connecting portion on the end side 18 can have a recess for an overflow valve 28, wherein the recess can be directly adjacent to the outer wall of the economizer valve block 11 to facilitate the introduction of the overflow valve 28. The overflow valve 28 has the function of limiting the maximum flow through the connecting portion on the end side 18 so that cryogenic fluid cannot flow out in an uncontrolled manner if there is a defect in the removal system.

What is particularly relevant and specific for the economizer valve block 11 is that it can also comprise a further inlet port 29 and a further outlet port 30, which are connected by a further connection passage 31, the further connection passage 31 not communicating with the first-mentioned connection passage. This further connection passage 31 has the background that, due to the extremely small installation space that is available, especially in vehicles, only very little space can be provided between the economizer valve block 11 and the heat exchanger 4. Thereby, it would not always be possible, for example, to route a separate, angled line between the economizer valve block 11 and the heat exchanger 4, which, however, is not necessary if the economizer valve block 11 comprises said further connection passage 31. This embodiment is thus particularly preferred if the heat exchanger 4 and the economizer valve block 11 are located at a maximum distance of 10 cm, preferably of 5 cm, particularly preferably of 3 cm, between each other.

Furthermore, the economizer valve block 11 can have one or several sensor recesses 32 for a sensor 33 which are open towards the outside and start at the connecting portion on the gas phase side 16, at the connecting portion on the liquid phase side 17, at the connecting portion on the end side 18 and/or at the further connection passage 31. The sensor is preferably a pressure sensor and/or a temperature sensor and can be connected directly or indirectly via a line to the sensor recess 32. In the example of FIG. 2, the sensor recess 32 is connected to the further connection passage 31, and a sensor 33 designed as a temperature sensor is directly connected to the sensor recess 32. The attachment of a sensor 33 to the further connection passage 31 is particularly preferred since the measurement of the temperature or, respectively, the pressure of a cryogenic fluid recirculated through the further connection passage 31 is of particular relevance, as will be explained more precisely below for the pressure management system.

FIGS. 5 and 6 show that the components connected downstream of the heat exchanger 4 can also be integrated within a single-piece valve block, the so-called pressure management valve block 12. The design of the pressure management valve block 12 is essentially independent of the design of the economizer valve block 11. While the economizer valve block 11 implements an economizer, the pressure management valve block 12 is supposed to integrate a so-called pressure management system within a single single-piece valve block. In a pressure management system, part of the cryogenic fluid is branched off in a generally known manner downstream of the heat exchanger 4 and is fed into a further internal heat exchanger 34 with a third inlet E3 and a third outlet A3, the internal heat exchanger 34 protruding into the cryogenic container 1. The branching off of a partial flow of cryogenic fluid can be effected, for example, by specifically generating a pressure difference between the lines, as described, for example, in WO 2021/026580 A1. The pressure management system is also well known and, therefore, it will not be discussed any further herein.

The heat exchanger 4 shown in FIGS. 5 and 6 essentially corresponds to that of FIGS. 2 and 4. Therefore, cryogenic fluid removed from the cryogenic container 1 first flows through the economizer valve block 11, then through the heat exchanger 4 and then through the pressure management valve block 12.

The pressure management valve block 12 comprises at least a first inlet port 35, a second inlet port 36, a first outlet port 37 and a second outlet port 38. In the embodiment of FIG. 5, all four ports 35, 36, 37, 38 inside the pressure management valve block 12 are interconnected by a connection passage. The second outlet port 38 is connected to an output line out, which can be routed to a consumer, e.g., an engine or a fuel cell, of the vehicle.

In the embodiment of FIG. 6, only the first inlet port 35, the first outlet port 37 and a second outlet port 38 are interconnected by a connection passage. The second inlet port 36 is connected to a third outlet port 39 via a further connection passage 39*b* not in communication with the aforementioned connection passage. An intermediate line out 2 connects to the third outlet port 39, connecting it at a second node 44' to the output line out.

In the two aforementioned embodiments of FIGS. 5 and 6, the connection passage connecting the ports 35, 37 and 38 comprises a first connecting portion on the inlet side 40, a first connecting portion on the outlet side 41 and a second connecting portion on the outlet side 42, which converge at a node 43. The first connecting portion on the inlet side 40 extends between the first inlet port 35 and the node 43, the first connecting portion on the outlet side 41 extends between the first outlet port 37 and the node 43, and the second connecting portion on the outlet side 42 extends between the second outlet port 38 and the node 43. In the embodiment of FIG. 5, the second inlet port 36 within the pressure management valve block 12 is connected via a second connecting portion on the inlet side 44 to the second connecting portion on the outlet side 42 at a second node 44', the second connecting portion on the outlet side 42 extending between the second inlet port 36 and the second node 44' on the second connecting portion on the outlet side 42. The second node 44' is located downstream of the first-mentioned node 43.

For implementing the function of the pressure management system, the pressure management valve block 12 has at least one valve recess 45 open towards the outside, the valve recess 45 starting at the first connecting portion on the outlet side 41, at the second connecting portion on the outlet side 42 or at the node 43.

In FIG. 5, the valve recess 45 starts at the node. A valve 46 is inserted into the valve recess 45 (FIG. 8), which valve is designed, in this embodiment, as a multi-way valve, as illustrated, for example, in FIG. 3, as it determines an aperture ratio between the first connecting portion on the inlet side 40, the first connecting portion on the outlet side 41 and the second connecting portion on the outlet side 42. The valve 46 can be designed in the same way as described above for the valve 21.

Alternatively or additionally, it can be envisaged that further valve recesses 47, 48 are designed on the first connecting portion on the outlet side 41 and/or on the second connecting portion on the outlet side 42. In this embodiment, a first valve (not illustrated) can be inserted into the valve recess 47, and a second valve (not illustrated) can be inserted into the valve recess 48. However, in this case, it is also possible to insert a rigid throttle into one of the valve recesses 47, 48.

The mode of operation of the pressure management system implemented in the pressure management valve block 12 will now be explained with reference to FIG. 7, in which the embodiments of FIGS. 2 and 5 are combined. However, it will be appreciated that any of the other embodiments could also be combined to achieve the function, even without an economizer, i.e., without an economizer valve 11.

According to FIG. 7, cryogenic fluid removed via the removal lines 9, 10 is guided through the economizer valve block 11 and is then supplied to the heat exchanger 4, which, for this purpose, comprises an internal first heat exchanger tube 49 with a first inlet E1 and a first outlet A1, with heat exchange medium being flushed around said tube, as will be explained in further detail below. As a result, the cryogenic fluid is heated and, if necessary, brought into a gaseous state. If the temperature conditions or, respectively, the pressure conditions of the cryogenic fluid are suitable for supply to the engine and the pressure in the cryogenic container 1 corresponds to a normal pressure, the valve(s) 46 in the valve recesses 45, 47, 48 can shut off the first connecting portion on the outlet side 41 so that the entire cryogenic fluid introduced into the first connecting portion on the inlet side 40 is supplied to the second connecting portion on the outlet side 42.

However, if it is desired to increase the pressure in the cryogenic container 1 and/or to influence the temperature of the gas supplied to the engine, the valve(s) 46 is/are adjusted such that at least part of the cryogenic fluid is taken from the connecting portion on the inlet side 40 to the first connecting portion on the outlet side 41. On this path, the cryogenic fluid is guided through the internal heat exchanger 34, whereby the pressure in the cryogenic container 1 rises. Thereupon, the cryogenic fluid is optionally guided through a second heat exchanger tube 50 of the heat exchanger 4 so as to be heated again. The cryogenic fluid is then introduced into the second inlet port 36 of the pressure management valve block 12. The second heat exchanger tube 50 has a second inlet E2 and a second outlet A2, and usually the same heat exchange medium as with the first heat exchanger tube 49 is flushed around it. Depending on the embodiment, a heat exchange medium different from that of the first heat exchanger tube 49 can also be flushed around the second heat exchanger tube 50 so that two separate external heat exchangers will, in fact, be provided, which, however, are collectively referred to as the external heat exchanger 4 to facilitate consideration.

Figure 8:
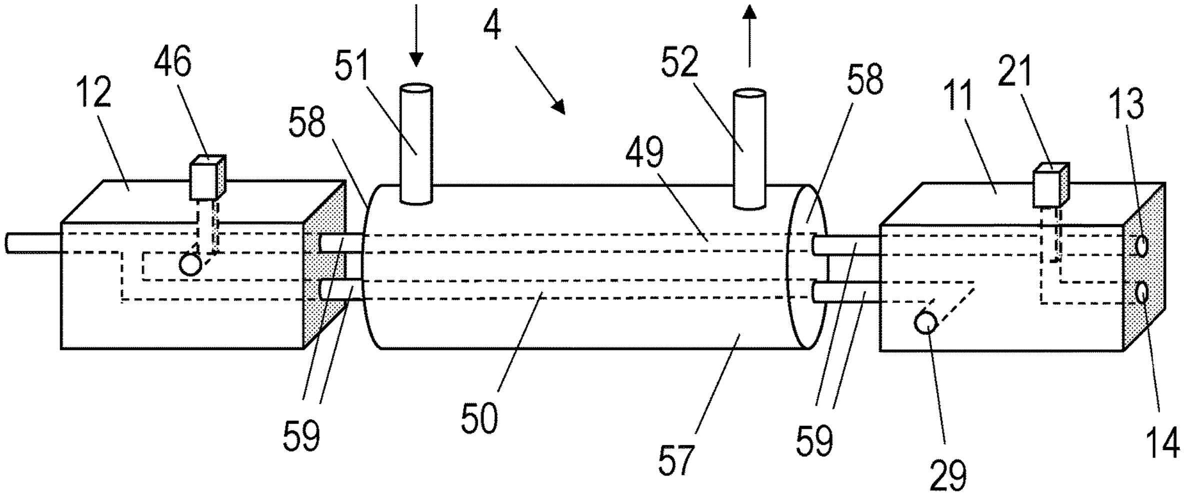
FIG. 8 shows an arrangement according to the invention with a heat exchanger, an economizer valve block and a pressure management valve block in a first embodiment.

The heat exchanger 4 thus has two independent heat exchange paths through the two separate heat exchanger tubes around which heat exchange medium is flushed respectively, the heat exchange medium being introduced into the heat exchanger 4 via a medium inlet 51 and being discharged therefrom via a medium outlet 52 (FIG. 8). The heat exchange medium can be, for example, air, gas, water or oil, with the heat of the heat exchange medium preferably being generated from the waste heat of the engine.

In a further embodiment, however, it could also be envisaged that the heat exchanger 4 comprises only the first heat exchanger tube 49 if an output line is routed from the internal heat exchanger 34 directly to the second inlet port 36 of the pressure management valve block 12.

The pressure management valve block 12, like the economizer valve block 11, can also implement additional functions. In particular, the pressure management valve block 12 can have a further valve recess 54 open towards the outside and starting at the second connecting portion on the end side 42, with a shut-off valve (not illustrated) being inserted into the further valve recess 54, which shut-off valve is actuated, for example, via a control unit and can be closed by said unit in case of an emergency.

Furthermore, the pressure management valve block 12 can have one or several sensor recesses 55 for sensors 56, the sensor recesses being open towards the outside and starting at the first connecting portion on the inlet side 40, at the second connecting portion on the inlet side 44, at the first connecting portion on the outlet side 41 and/or at the second connection passage on the outlet side 42. The sensor is preferably a pressure sensor and/or a temperature sensor and can be connected directly or indirectly via a line to the sensor recess 55. In the example of FIG. 5, a first sensor recess 55 is connected to the first connection passage on the inlet side 40, and a sensor 56 designed as a pressure sensor is directly attached to the sensor recess 55. Furthermore, a second sensor recess 55 is connected to the second connection passage on the outlet side 42, and a sensor 56 designed as a temperature sensor is directly attached to the sensor recess 55.

Figure 7:
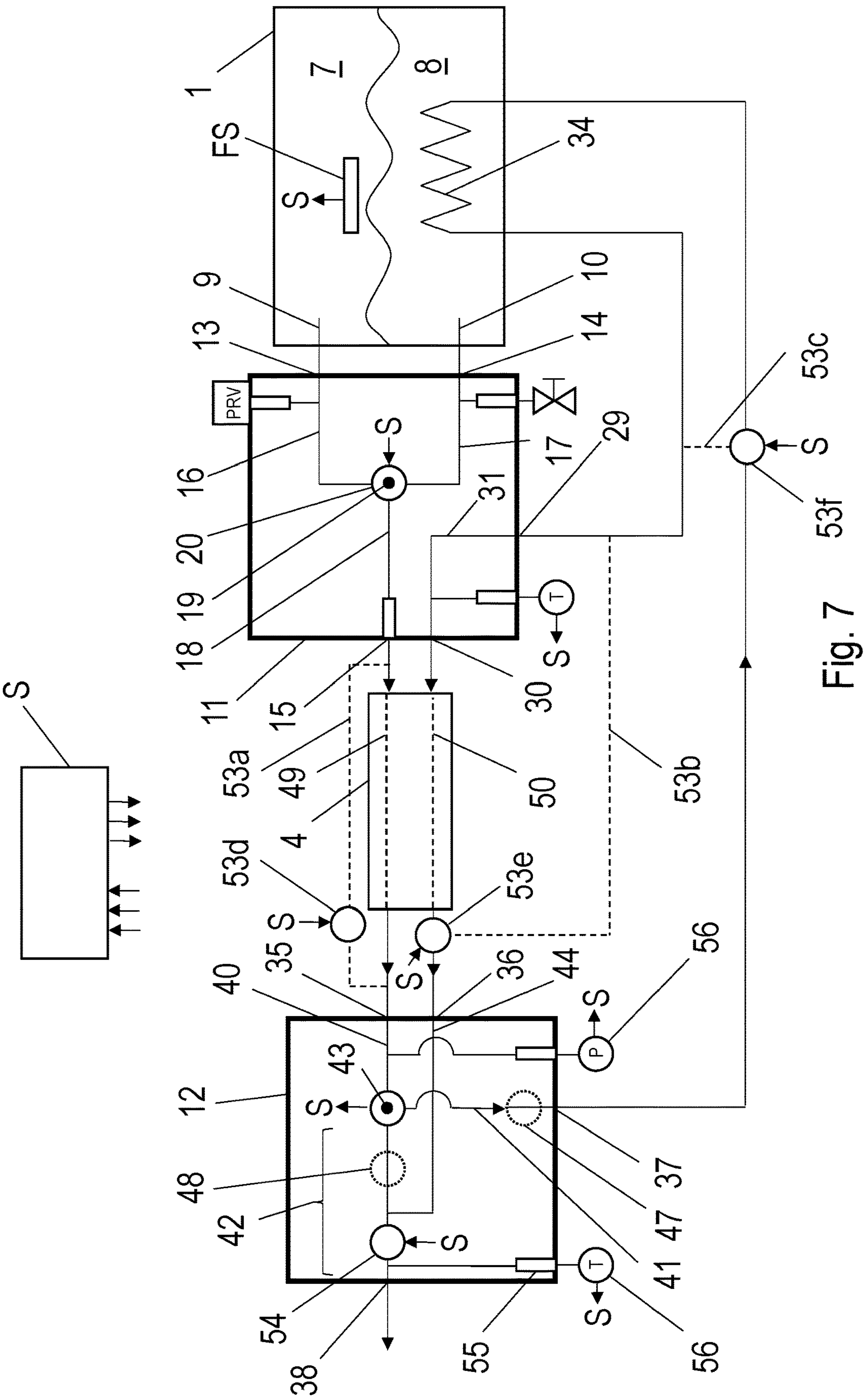
FIG. 7 shows a removal system comprising the economizer valve block according to the invention and the pressure management valve block according to the invention.

Furthermore, it is evident from FIG. 7 that the system can comprise a control unit S, which can receive measured values from the sensors 33, 56 and from a fill-level sensor FS in the cryogenic container 1 and, as a function thereof, can actuate the valves 21, 46 or, respectively, the other valves located in the described valve recesses. In FIG. 7, control lines between the control unit S and the sensors or, respectively, the valves are indicated by arrows in combination with the reference symbol S. The control unit S is not limited to the overall combination, but can also control only the economizer or only the pressure management or, respectively, individual valves thereof.

With reference to FIGS. 8 to 13, the arrangement of the economizer valve block 11 or, respectively, of the pressure management valve block 12 in relation to the heat exchanger 4 will now be explained. Unless explicitly described, it is not mandatory that the arrangement of the economizer valve block 11 must be provided only in connection with the pressure management valve block 12, or vice versa.

Figure 9:
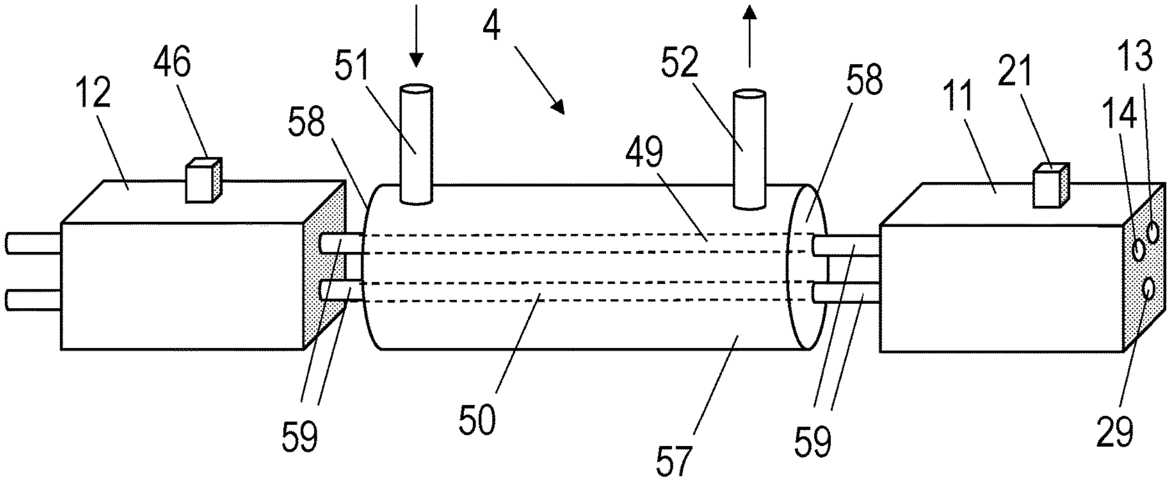
FIG. 9 shows an arrangement according to the invention with a heat exchanger, an economizer valve block and a pressure management valve block in a second embodiment.

It is evident from FIGS. 8 to 13 that the heat exchanger 4 can be essentially rod-shaped. In FIGS. 8 and 9, the heat exchanger 4 comprises, for example, a jacket 57 and two lateral surfaces 58. Such heat exchangers are known per se from the prior art. The jacket 57 is usually cylindrical, but can also assume a different shape and can be adapted, for example, to the shape of the cryogenic container in order to be placed, for example, flatly on the generated surface of the cryogenic container 1. The lateral surfaces 58 are usually flat plates. The connection openings of the heat exchanger 4 for the heat exchanger tubes 49, 50 are usually located in the lateral surfaces 58, and the medium inlet 51 and the medium outlet 52 are usually located in the jacket 57. The jacket 57 and the lateral surfaces 58 thus enclose a space in which the heat exchanger tube(s) 49, 50 is/are located, whereby this space is normally accessible only via the medium inlet 51 or, respectively, the medium outlet 52.

As illustrated in FIGS. 8 and 9, the economizer valve block 11 and the pressure management valve block 12, or at least one of them, can be arranged in an extension of the rod shape of the heat exchanger 4, i.e., one valve block 11, 12 each next to one of the lateral surfaces 58, resulting in a linear arrangement with the heat exchanger 4 in the middle. As a result, the arrangement can be chosen to be particularly slim, whereby the available installation space (see, for example, FIG. 13) can be utilized particularly efficiently and the pressure losses from the cryogenic container to the consumer (engine, fuel cell) can be minimized. In this case, the lateral surfaces 58 of the heat exchanger 4 are preferably located in parallel to one of the lateral surfaces of the economizer valve block 11 and/or of the pressure management valve block 12.

In the embodiment of FIG. 8, some of the connection openings—as indicated in FIGS. 2 to 7—are located on one side of the respective valve block 11, 12, and other connection openings are located on another side that is normal thereto. For laying the connecting lines as efficiently as possible, all openings can be arranged, as in FIG. 9, on one side of the respective valve block 11, 12, either facing the heat exchanger 4 or facing away from it. The direction of the outlets, e.g., in the valve blocks 11, 12, can also just be arranged in such a way that they are located, for example, at right angles to the longitudinal axis of the heat exchanger 4 in order to allow the cryogenic container to be easily linked to the vehicle, whereby, for example, a 90° elbow piece can be omitted.

Furthermore, FIGS. 8 and 9 show that the valve blocks 11, 12 can be essentially rectangular and the heat exchanger 4 can be essentially cylindrical. However, the valve blocks 11, 12 and the heat exchanger 4 preferably have a shape in cross-section essentially equal to a longitudinal axis of the heat exchanger 4 so that they can be arranged congruently.

It is evident from FIGS. 8 and 9 that the valve blocks 11, 12 are not directly attached to the cryogenic container 1, but that connecting lines 59 can be arranged therebetween. The connecting lines 59 preferably have a length of a maximum of 20 cm, preferably of a maximum of 10 cm, particularly preferably of a maximum of 5 cm. In other embodiments (not illustrated), the valve blocks 11, 12 or, respectively, at least one of the valve blocks 11, 12 can be directly attached to the heat exchanger 4. For example, the lateral surface 58 can have appropriate connecting pieces which are pushed into the respective opening of the respective valve block 11, 12, whereupon a fluid-tight connection can be produced, for example, by soldering. The distance between the heat exchanger 4 and the respective valve block 11, 12 can thus be reduced, if necessary, it can be reduced to essentially 0 cm.

Figure 10:
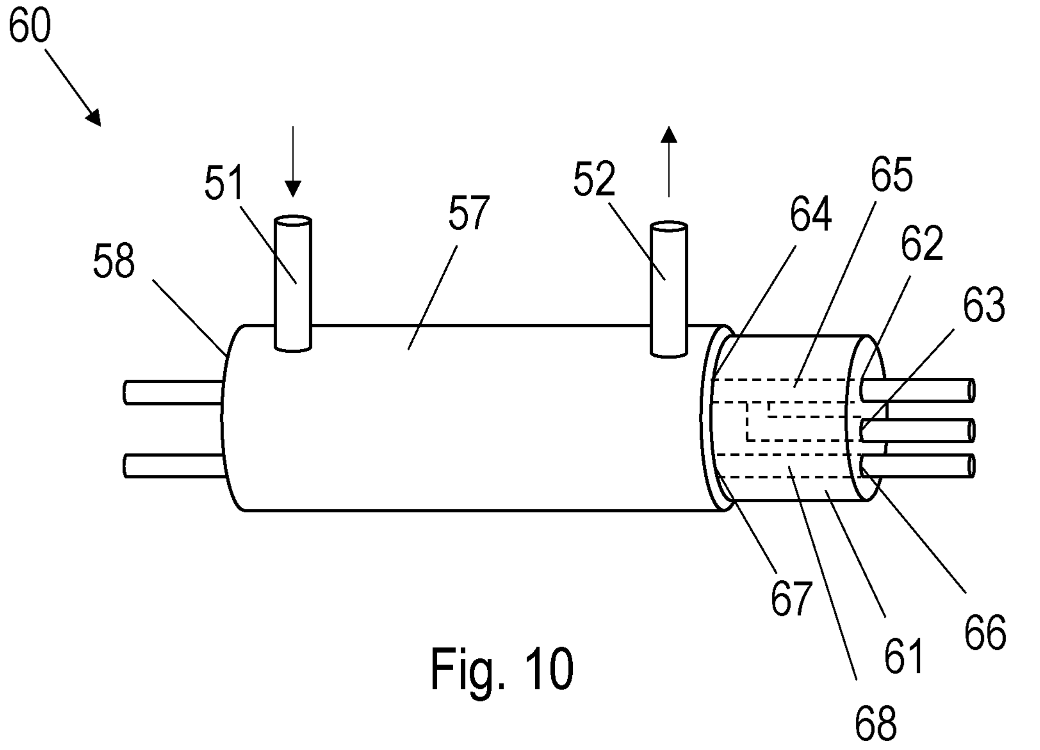
FIG. 10 shows a heat exchanger with an integrated connection block.

FIG. 10 shows a particularly space-saving embodiment for a novel heat exchanger 60 in which one lateral surface is formed by a connection block 61. The other lateral surface can be formed as a flat plate like the lateral surface 58 of the known heat exchanger 4. The heat exchanger 60 thus comprises a connection block 61, a jacket 57 and a flat plate. The jacket 57 is connected to the connection block 61 in a fluid-tight manner, welded to it, for example. The connection block 61 can be provided at the inlet end or the outlet end of the heat exchanger 60. Alternatively, the heat exchanger 60 can also have a connection block 61 on either side, which are connected to the jacket 57 in a fluid-tight manner.

The connection block 61 is designed as a single-piece connection block which has at least two outer openings 62, 63 for cryogenic fluid and at least one inner opening 64 for cryogenic fluid, which are connected inside the single-piece connection block 61 by a connection passage 65. The outer openings 62, 63 are accessible from the outside, e.g., for the at least indirect (via valves, etc.) connection of the removal lines 9, 10 when the connection block 61 faces the cryogenic container 1 in the removal direction, or for the connection of a line routed to the engine or, respectively, of a line routed to the inner heat exchanger 34. The inner opening 64 is connected to the first heat exchanger tube 49.

In the simplest case, the connection block 61 can thus form a T-piece. However, the connection block 61 can also have at least one further outer opening 66 and at least one further inner opening 67, which are connected inside the single-piece connection block 61 by a further connection passage 68, the first-mentioned connection passage 65 and the further connection passage 68 not being in communication.

Therefore, the connection block 61 does not have to exhibit a valve recess open towards the outside or, respectively, does not have to be able to accommodate a valve. If it does so anyway, it is typically referred to as a valve block and can be designed like the economizer valve block 11 described above or like the pressure management valve block 12. If the connection block 61 forms the economizer valve block 11, the outer openings 62, 63 correspond to the first and second inlet ports 13, 14, respectively, and the inner opening 64 corresponds to the outlet port 15. If the connection block 61 forms the pressure management valve block 12, the outer openings 62, 63 correspond to the first and second outlet ports 37, 38, respectively, and the inner opening 64 corresponds to the inlet port 35.

Figure 11:
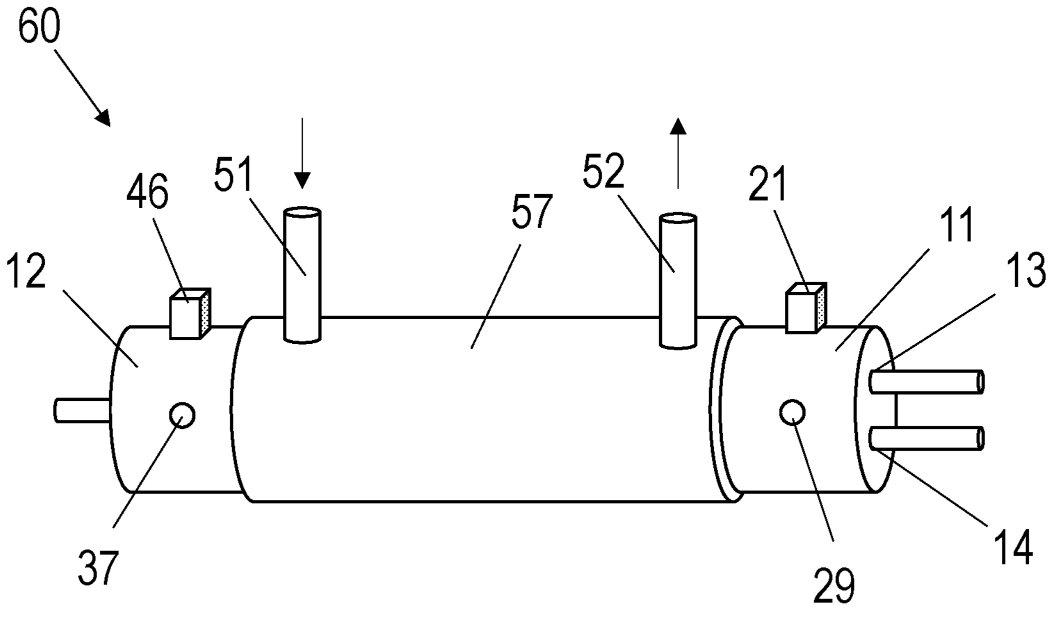
FIG. 11 shows a heat exchanger with an integrated pressure management valve block and an integrated economizer valve block in a first embodiment.
Figure 12:
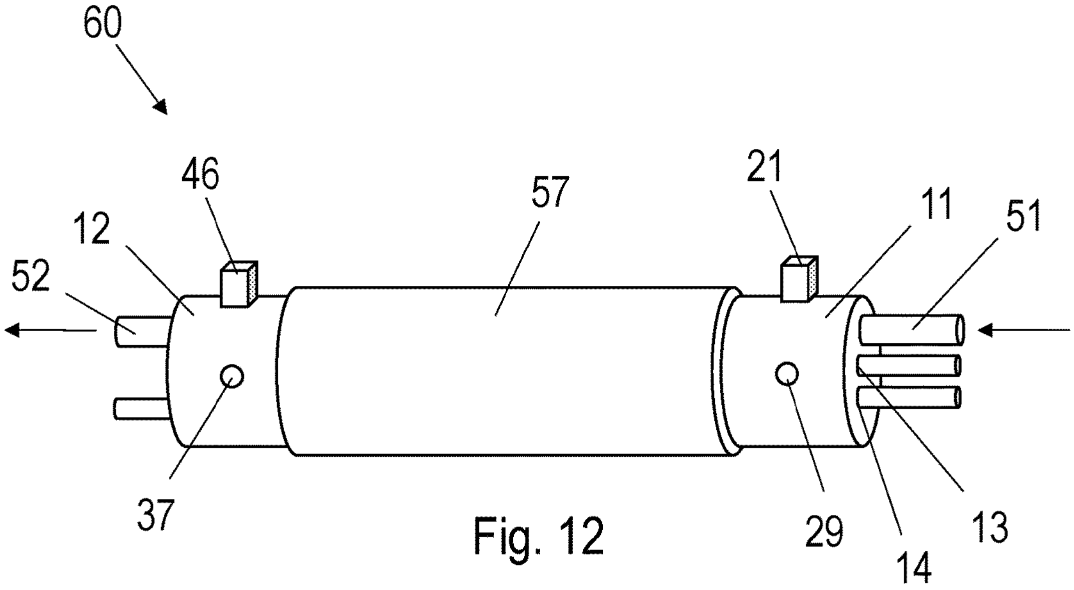
FIG. 12 shows a heat exchanger with an integrated pressure management valve block and an integrated economizer valve block in a second embodiment.

The heat exchanger 60 preferably has the above-described economizer valve block 11 at one end and the above-described pressure management valve block 12 at the other end, with these valve blocks being connected by the jacket 57. A corresponding embodiment is illustrated in FIG. 11. The heat exchanger tube(s) 49, 50 can then be routed within the jacket 57, and heat exchange medium can be flushed around them. Even if the heat exchanger tubes 49, 50 are depicted as straight tubes in the figures for better clarity, they are usually designed as spiral tubes so as to offer a larger surface area for heat transfer. The first heat exchanger tube 49 can be connected to the outlet port 15 of the economizer valve block 11 and to the first inlet port 35 of the pressure management valve block 12. The second heat exchanger tube 50 can be connected to the further outlet port 30 of the economizer valve block 11 and to the second inlet port 36 of the pressure management valve block 12.

For connecting the jacket 57 to the connection block(s) 61 in a fluid-tight manner, the jacket 57 preferably has at its ends an inner contour which corresponds to the outer contour of the respective connection block 61 at the connecting point to the jacket 57. As a result, the jacket 57 can be guided over the connection block 61, and the jacket 57 can be fastened to the connection block 61 in a fluid-tight manner, with a circumferential weld seam, for example. This is illustrated in FIGS. 10 to 13.

At least at one end, the jacket 57 can alternatively also have an outer contour which corresponds to or is smaller than the outer contour of the respective connection block 61. In this case, too, a circumferential weld seam can be used for connecting the jacket 57 to the connection block(s) 61.

According to FIGS. 10 and 11, the heat exchanger 60 has a medium inlet 51 and a medium inlet 52 on the jacket 57. However, according to FIG. 12, it can also be envisaged that the medium inlet 51 and/or the medium outlet 52 is/are provided in the connection block 61. For example, one of the connection blocks 61 can have both the medium inlet 51 and the medium outlet 52, or one of the connection blocks 61 can have the medium inlet 51 and the other one of the connection blocks 61 can have the medium outlet 52. Also, the medium inlet 51 or, respectively, the medium outlet 52 could be arranged in the jacket 57, and the corresponding other medium outlet 52 or medium inlet 51 could be arranged in the connection block 61. If this is envisaged for the economizer valve block 11 or, respectively, for the pressure management valve block 12, the corresponding valve block will have an additional connection passage not connected to the other connection passages. Moreover, this could also be envisaged if a conventional heat exchanger, as in FIGS. 8 and 9, is used, wherein connecting lines for the heat exchange medium can optionally be provided between the valve block 11, 12 and the heat exchange medium.

Figure 13:
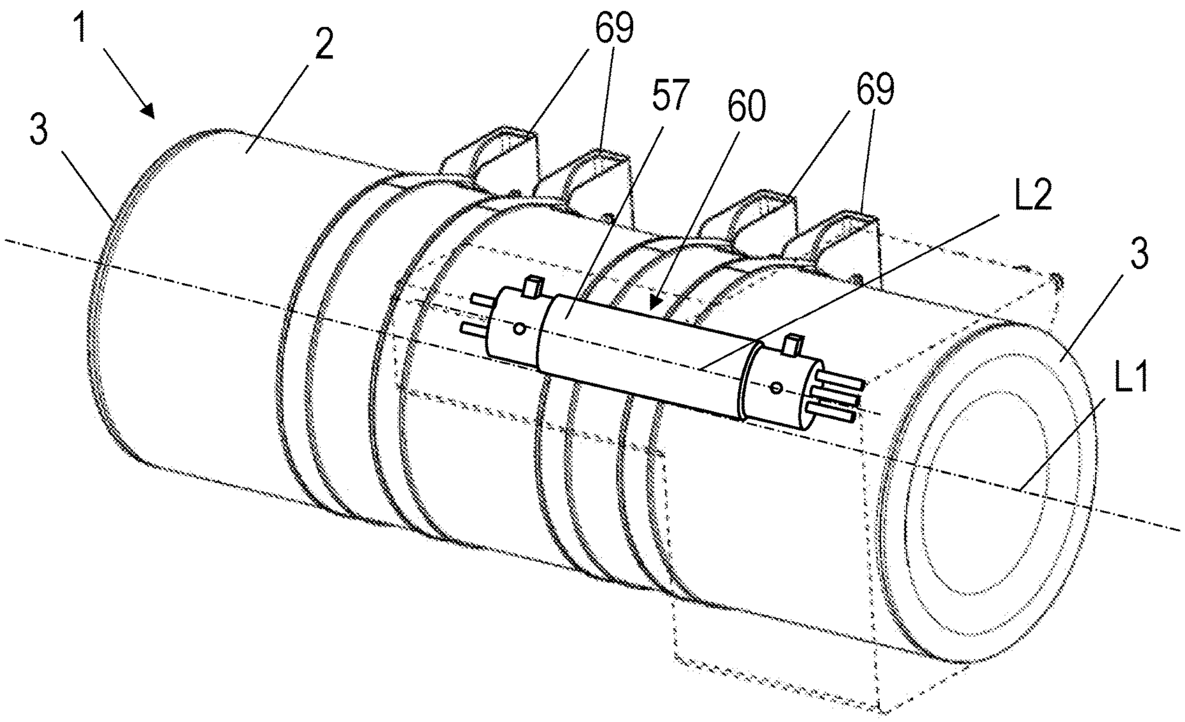
FIG. 13 shows the arrangement of the heat exchanger of FIG. 12 on a cryogenic container.

In principle, the heat exchanger 60 with the connection block 61 can also be arranged on an end cap 3 of the cryogenic container 1, for example in a position as shown in FIG. 1. However, as shown in FIG. 13, it makes sense, in particular, to arrange the heat exchanger 60 essentially in parallel to the cryogenic container 1 or the cryogenic container jacket 2 thereof, i.e., a longitudinal axis L1 of the cryogenic container 1 is located in parallel to a longitudinal axis L2 of the heat exchanger 60. If the cryogenic container 1 is mounted on a vehicle frame of the vehicle by means of supporting brackets 69, the heat exchanger 60 is located on the upper half of the cryogenic container 1 and faces away from the vehicle frame. Alternatively, the heat exchanger 60 can also be located on the side facing the vehicle frame so as not to be exposed to a direct impact, possibly in case of an accident.

The heat exchanger 60 is located, for example, directly adjacent to the cryogenic container jacket 2 or at a distance from it and is located at least partially between the end caps 3, whereby it can also protrude beyond one of the end caps 3, particularly if they have a convex design. Particularly preferably, the heat exchanger 60 is located at least partially, preferably completely, within a smallest possible imaginary cuboid that circumscribes the cryogenic container 1.

Figure 14:
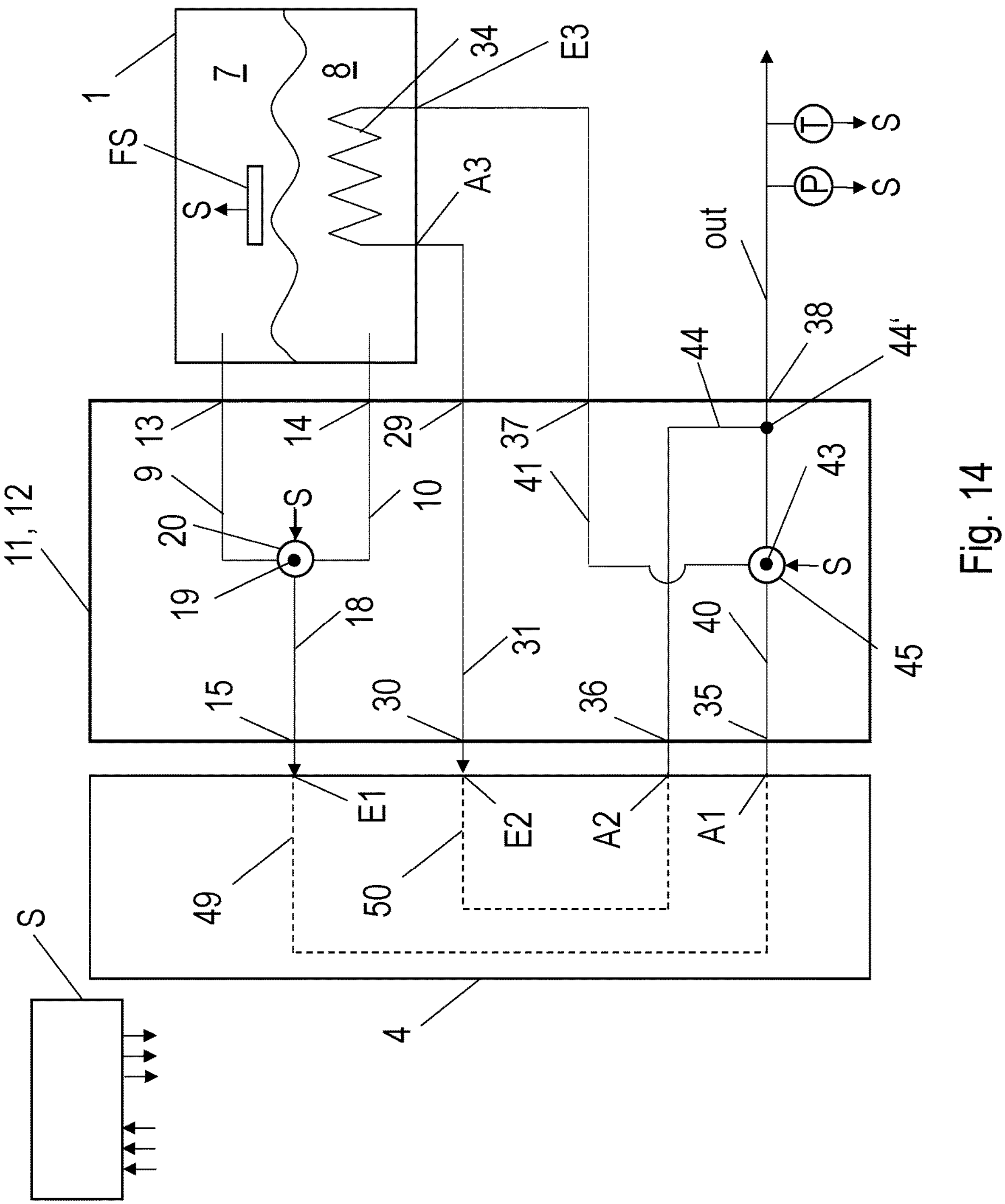
FIG. 14 shows an embodiment in which the economizer valve block and the pressure management valve block are designed together in one valve block.

FIG. 14 shows an embodiment in which a valve block 11, 12 is used, wherein the features of the economizer valve block 11 and the pressure management valve block 12 are combined. It is thus a valve block 11, 12 which has an inlet port 13 for a line for the removal of cryogenic fluid in the gas phase, an inlet port 14 for a line for the removal of cryogenic fluid in the liquid phase, an inlet port 29 for connection to the outlet A3 of the internal heat exchanger 34, an outlet port 37 for connection to the inlet E3 of the internal heat exchanger 34 and an outlet port 38 for the output line out. All these ports can, but do not have to, be arranged on a common side of the valve block 11, 12. Furthermore, the valve block 11, 12 has an outlet port 15 for the inlet opening E1 of the first heat exchanger tube 49, an inlet port 35 for the outlet opening A1 of the first heat exchanger tube 49, an outlet port 30 for the inlet opening E2 of the second heat exchanger tube 50 and an inlet port 36 for the outlet opening A2 of the second heat exchanger tube 50. Furthermore, the valve block 11, 12 can comprise inlet ports and outlet ports for heat exchange medium (not illustrated). The connection passages, the valve recesses and the optional embodiments are feasible as described for FIGS. 2 to 7.

Figure 15:
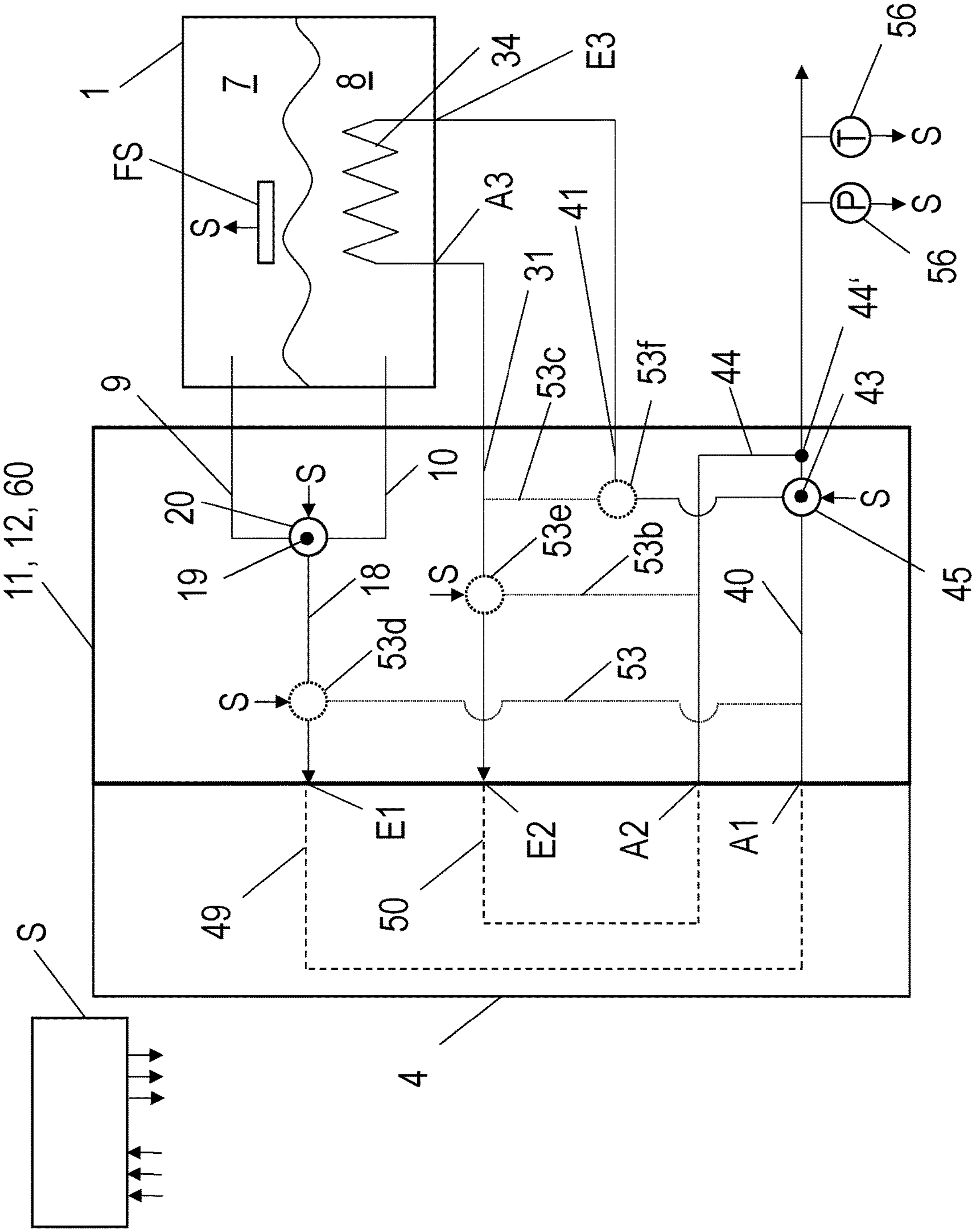
FIG. 15 shows a variant of FIG. 14 with bypass lines within the valve block.

As shown in FIG. 15, the valve block 11, 12 and the external heat exchanger 4 can be spaced apart from each other and connected by means of intermediate lines. As shown in FIG. 15, it would alternatively be possible to mount the valve block 11, 12 directly and without any intermediate lines on the external heat exchanger 4 or, respectively, to integrate the valve block 11, 12 as a side wall in the heat exchanger, as described with regard to FIGS. 10 to 13.

Turning back to FIG. 7, it is shown that, for connecting the heat exchanger tubes 49, 50 or, respectively, the internal heat exchanger 34 in parallel, bypass lines 53*a*, 53*b*, 53*c* can be provided as follows:

- a first bypass line 53*a* for the first heat exchanger tube 49, the first bypass line 53*a* connecting upstream of the first inlet E1 of the first heat exchanger tube 49 to the connecting portion on the end side 18 or to a line emanating from the first inlet E1 and connecting downstream of the first outlet A1 of the first heat exchanger tube 49 to the first connecting portion on the inlet side 40 or to a line emanating from the first outlet A1;
- a second bypass line 53*b* for the second heat exchanger tube 50, the second bypass line 53*b* connecting upstream of the second inlet E2 to the further connection passage 31 or to a line emanating from the second inlet E2 and connecting downstream of the second outlet A2 to the second connecting portion on the inlet side 44 or to a line emanating from the second outlet A2;
- a third bypass line 53*c* for the internal heat exchanger 34, the third bypass line 53*c* connecting upstream of the third inlet E3 to the first connecting portion on the outlet side 41 or to a line emanating from the third inlet E3 and connecting downstream of the third outlet A3 to the further connection passage 31 or to a line emanating from the third outlet A3.

In the bypass lines 53*a*, 53*b*, 53*c*, valves 53*d*, 53*e*, 53*f* can be arranged which are optionally inserted into valve recesses in the valve blocks 11, 12. The valves 53*d*, 53*e*, 53*f* can be designed as 2/2-way valves in the bypass lines 53*a*, 53*b*, 53*c*, as illustrated for the valve 53*d*, or as a multi-way valve at the front or rear connection point to the respective line or to the respective connection passage, as illustrated for the valves 53*e*, 53*f*. The valves 53*d*, 53*e*, 53*f* are preferably connected to the control unit S or can be operated manually. Especially in this embodiment, the control unit S can be connected to at least one sensor for determining pressure readings and/or temperature readings, wherein the sensor is arranged, as explained above, in the cryogenic container 1, in one of the valve blocks 11, 12 or in a line connected thereto, in particular in the output line out, the control unit S being designed for controlling a mass flow of cryogenic fluid through the first, second and/or third bypass line 53*a*, 53*b*, 53*c*, depending on the pressure readings and/or temperature readings received from the sensor, for example, by the valves 53*d*, 53*e*, 53*f* being actuated accordingly.

The control unit S can be designed for receiving or determining a temperature downstream of the second node 44', a pressure downstream of the second node 44' and a pressure in the cryogenic container 1 and for controlling a mass flow via the second connecting portion on the inlet side 44, the first, the second and/or the third bypass line 53*a*, 53*b*, 53*c* under the conditions that the temperature downstream of the second node 44' or, respectively, in the output line out is at or above a predetermined minimum temperature, the pressure downstream of the second node 44' or, respectively, in the output line out is at or above a predetermined minimum pressure and the pressure in the cryogenic container 1 is minimized. For this purpose, the control unit S can:

- increase the mass flow through the first bypass line 53*a* or the second bypass line 53*b* when the temperature downstream of the second node 44' is above a predetermined threshold;
- increase the mass flow through the third bypass line 53*c* when the temperature downstream of the second node 44' is below a predetermined threshold;
- increase the mass flow of cryogenic fluid via the first bypass line 53*a* when the pressure in the cryogenic container 1 or downstream of the second node 44' is below a predetermined threshold, the control unit S preferably being designed for relaxing or suspending a condition regarding a required minimum temperature of the consumer.

In particular, the start of the consumer can also be optimized with the bypass lines 53*a*, 53*b*, 53*c*, since the temperature of the heat exchange medium will change after the start of the consumer, i.e., the heat exchange medium is provided at a first temperature at the onset of an operation and, after a predetermined period of time upon the onset of the operation, the heat exchange medium is provided at a second temperature which is higher than the first temperature. The external heat exchanger 4 can be designed for bringing the cryogenic fluid at least to the predetermined minimum temperature of the consumer at the onset of the operation when the cryogenic fluid is being passed through the first heat exchanger tube 49 once, and the control unit S can be designed so as not to guide any mass flow of cryogenic fluid via the first bypass line 53*a* and/or the second bypass line 53*b* at the onset of the operation and for guiding a mass flow of cryogenic fluid via the first bypass line 53*a* and/or the second bypass line 53*b* after the predetermined period of time, optionally under the condition that the temperature downstream of the second node is at a predetermined minimum temperature. Alternatively, the external heat exchanger 4 can be designed for bringing the cryogenic fluid only to a temperature which is below the predetermined minimum temperature of a consumer at the onset of the operation when the cryogenic fluid is being passed through the first heat exchanger tube 49 once, and the control unit S can be designed for guiding a mass flow of cryogenic fluid via the third bypass line 53*c* at the onset of the operation and so as not to guide any mass flow of cryogenic fluid via the third bypass line 53*c* after the predetermined period of time, optionally under the condition that the temperature downstream of the second node is at a predetermined minimum temperature.

As illustrated in FIG. 7, the bypass lines 53*a*, 53*b*, 53*c* can be routed at least or even completely outside of the valve blocks 11, 12, whereby the connection point to the respective connecting portion is, however, located inside the valve block 11, 12 so as to again eliminate an external T-piece or valve. In these embodiments, it might also be possible to use only one of the valve blocks 11, 12.

FIG. 15 shows an embodiment in which the bypass lines 53*a*, 53*b*, 53*c* are provided completely within a single valve block 11, 12, which can be implemented in a valve block as shown in FIG. 14.

The invention described herein relates in particular to the economizer functions of the system, and any variants, particularly with respect to the pressure management functions, are merely optional and not limiting, unless otherwise specified. In particular, the economizer valve block 11 could also be used without that in a system without a pressure management function, i.e., not in conjunction with the pressure management valve block.

The invention claimed is:

1. A system comprising:

a cryogenic container that is an LNG container or a hydrogen container, the cryogenic container including a first removal line for removing cryogenic fluid in a gas phase and a second removal line for removing cryogenic fluid in a liquid phase, wherein the first removal line and the second removal line are routed into the cryogenic container;

the system further comprising:

a single-piece economizer valve block having at least a first inlet port, a second inlet port and an outlet port, the first inlet port, the second inlet port, and the outlet port being connected inside the single-piece economizer valve block by a connection passage having a connecting portion on the gas phase side, a connecting portion on the liquid phase side and a connecting portion on an end side, which converge at a node, wherein:

the first removal line is connected to the first inlet port and the second removal line is connected to the second inlet port, and the single-piece economizer valve block includes at least one valve recess open towards an outside, the at least one valve recess starting at the connecting portion on the gas phase side, at the connecting portion on the liquid phase side or at the node on the connection passage, and a valve being inserted into the valve recess of the single-piece economizer valve block.

2. The system according to claim 1, wherein the valve recess starts at the node of the connection passage, and the valve is configured as a multi-way valve between the connecting portion on the gas phase side, the connecting portion on the liquid phase side and the connecting portion on the end side.

3. The system according to claim 2, wherein the valve allows only three switching states, wherein:

in the first switching state, only the connection to the connecting portion on the gas phase side is completely closed, in the second switching state, only the connection to the connecting portion on the liquid phase side is completely closed and, in the third switching state, both the connection to the connecting portion on the gas phase side and that to the connecting portion on the liquid phase side are completely closed.

4. The system according to claim 2, wherein the valve is configured for selectively throttling the connection to the connecting portion on the gas phase side and the connection to the connecting portion on the liquid phase side.

5. The system according to claim 1, wherein the single-piece economizer valve block has a first and a second valve recess open towards the outside, the first valve recess starting at the connecting portion on the gas phase side and the second valve recess starting at the connecting portion on the liquid phase side, with a first valve being inserted into the first valve recess and a second valve being inserted into the second valve recess, the first and second valves each being proportional valves or valves with discrete switching states.

6. The system according to claim 1, wherein the single-piece economizer valve block has a further valve recess open towards the outside and starting preferably at the connecting portion on the gas phase side, with a pressure relief valve being connected to the further valve recess.

7. The system according to claim 1, wherein the single-piece economizer valve block has a connection recess for a drain connection, the connection recess being open towards the outside and starting at the connecting portion on the liquid phase side, the drain connection being configured as a shut-off valve inserted directly into the connection recess.

8. The system according to claim 1, wherein the connecting portion on the end side has a recess for an overflow valve which is configured for limiting a maximum flow through the connecting portion on the end side.

9. The system according to claim 1, wherein the single-piece economizer valve block comprises a further inlet port and a further outlet port, which are connected by a further connection passage, the further connection passage not communicating with the connection passage.

10. The system according to claim 9, wherein the single-piece economizer valve block has two further connection passages that communicate neither with each other nor with the first-mentioned connection passage, with one of the further connection passages being connected to a pressure management system and the other one of the connection passages being connected to an input line for heat exchange medium.

11. The system according to claim 1, wherein the single-piece economizer valve block has one or several sensor recesses for a sensor, the sensor recesses being open towards the outside and starting at the connecting portion on the gas phase side, at the connecting portion on the liquid phase side, at the connecting portion on the end side and/or at the further connection passage.

12. The system according to claim 1, furthermore comprising a heat exchanger, the outlet port of the single-piece economizer valve block being connected directly to an inlet of the heat exchanger, without any intermediate line.

13. The system according to claim 12, the single-piece economizer valve block comprising a further input port and a further outlet port, wherein both the outlet port and a further outlet port are connected to the heat exchanger.

14. The system according to claim 12, wherein the heat exchanger has a rod-shaped design with a generated surface and two lateral surfaces, with the economizer valve block being arranged in an extension of the heat exchanger next to one of the lateral surfaces.

15. The system according claim 1, comprising a rod-shaped heat exchanger with a jacket, the economizer valve block forming one of the lateral surfaces of the heat exchanger and a first end of the jacket being connected to the economizer valve block in a fluid-tight manner.

16. The system according to claim 12, wherein the cryogenic container has a cryogenic container jacket and two end caps, wherein the heat exchanger is arranged essentially in parallel to the cryogenic container jacket and both the heat exchanger and the economizer valve block next to the cryogenic container jacket lie at least partially between the end caps.

17. The system according to claim 16, wherein the heat exchanger and/or the economizer valve block protrudes beyond one of the end caps, with at least one of the inlet ports and/or outlet ports being arranged in the direction of the vehicle frame.

18. The system according to claim 1, furthermore comprising a control unit which is connected to at least one valve of the economizer valve block, the control unit being configured for adjusting a removal ratio of gas phase to liquid phase of the cryogenic fluid from the cryogenic container.

19. The system according to claim 18, furthermore comprising at least one sensor which is inserted into a sensor recess of the economizer valve block or of a pressure management valve block, the control unit being configured for controlling the valve or valves depending on a measured value supplied by the sensor.

* * * * *